United States Patent [19]
Hardenberg et al.

[11] 3,794,007
[45] Feb. 26, 1974

[54] PROCESS AND APPARATUS FOR MULTI-FUEL OPERATION OF AN AIR-COMPRESSING AND AUTO-IGNITING INJECTION INTERNAL COMBUSTION ENGINE

[75] Inventors: Horst Hardenberg, Stuttgart; Gerhard Fränkle, Grunbach, both of Germany

[73] Assignee: Daimler-Benz Aktiengesellschaft, Stuttgart-Unterturkheim, Germany

[22] Filed: Mar. 27, 1972

[21] Appl. No.: 238,336

[30] Foreign Application Priority Data
Mar. 27, 1971  Germany............ 2115001

[52] U.S. Cl...... 123/122 D, 123/122 G, 123/179 H, 123/179 L
[51] Int. Cl........... F02m 31/04, F02n 17/00
[58] Field of Search.......... 123/179 H, 179 L, 179 R, 122 D, 123/122 G, 142.5, 180 R

[56] References Cited
UNITED STATES PATENTS

| | | | |
|---|---|---|---|
| 2,044,113 | 6/1936 | Woolson | 123/179 H |
| 3,020,903 | 2/1962 | Kloss | 123/142.5 R |
| 3,024,777 | 3/1962 | Baker | 123/122 G |
| 3,335,710 | 8/1967 | Reddy | 123/179 L X |
| 3,353,520 | 11/1967 | Haag | 123/122 D X |
| 3,450,109 | 6/1969 | Gratzmuller | 123/122 D X |
| 3,534,723 | 10/1970 | Tramontini | 123/142.5 R X |
| 3,656,465 | 4/1972 | Frankle | 123/179 H |
| 3,687,122 | 8/1972 | Kamo | 123/122 G |

Primary Examiner—Al Lawrence Smith
Attorney, Agent, or Firm—Craig and Antonelli

[57] ABSTRACT

A method and apparatus for the operation of an air-compressing and auto-igniting injection-type internal combustion engine for multi-fuel operation in which a flame-suction-air heater, known as such, for cold-starting operation is started during the operation of the engine under load with poorly ignitable fuels such as gasoline; the engine is thereby of the type which has a relatively low compression ratio for self-igniting fuel operation.

38 Claims, 3 Drawing Figures

PATENTED FEB 26 1974  3,794,007
FIG. 1
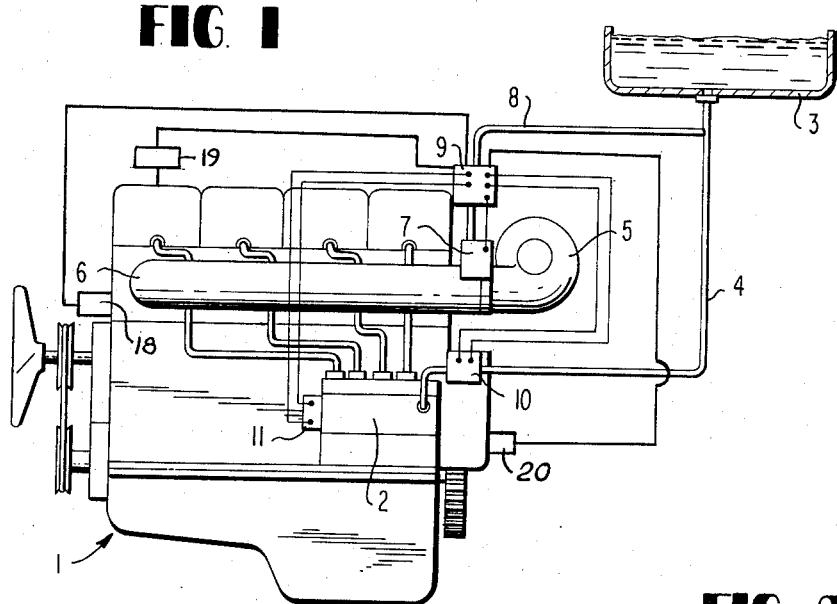
FIG. 2
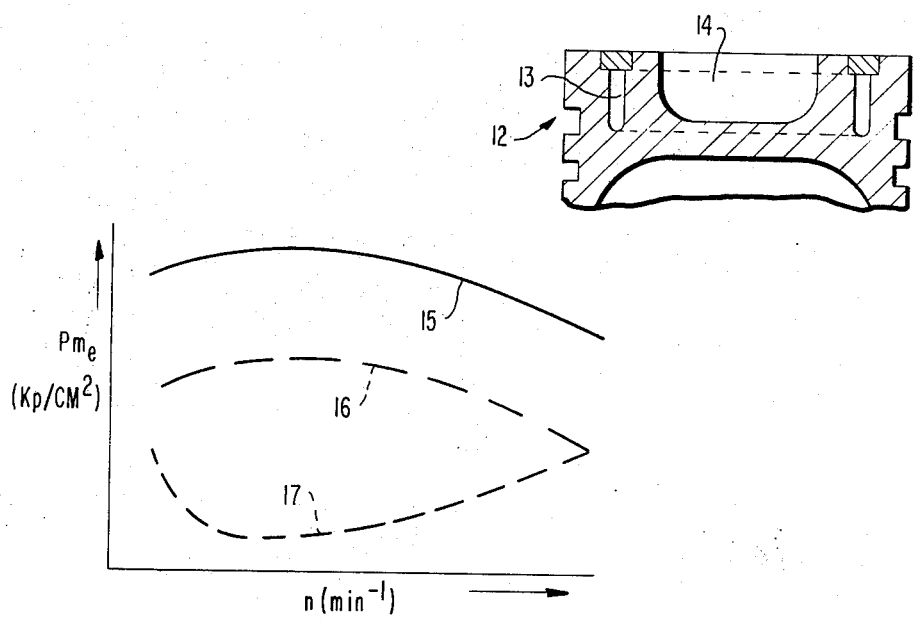
FIG. 3

PROCESS AND APPARATUS FOR MULTI-FUEL OPERATION OF AN AIR-COMPRESSING AND AUTO-IGNITING INJECTION INTERNAL COMBUSTION ENGINE

The present invention relates to a process for the operation of an air-compressing and auto-igniting injection internal combustion engine for multi-fuel operation and an internal combustion engine operating according to this process. During the ooperation with a poorly ignitable fuel, such as, for example, gasoline, it often involves difficulty to attain a completely satisfactory self- or auto-ignition and to maintain a satisfactory operation under load.

It is known for avoiding these difficulties to preheat the suction air with the aid of a heat-exchanger, through which flows the cooling water, or also to add heat thereto by the admixture of exhaust gases. Both prior art solutions do not satisfy in numerous cases. An upper limit is imposed to the heating by means of a cooling water heat-exchanger by the cooling water temperature, and exhaust gases in the suction air reduce the oxygen content of the combustion air.

The present invention is concerned with the task to achieve a safe auto-ignition under load operation by simple means also in case of very poorly ignitable fuels, in internal combustion engines with a relatively low compression ratio (and corresponding low mechanical load) or under otherwise unfavorable operating conditions. The underlying problems are solved in accordance with the present invention in that —especially in engines with a compression ratio which is relatively low for self-igniting multi-fuel operation, preferably with a compression ratio as utilized with customary Diesel engines — during the operation under load conditions with poorly ignitable fuels, for example, gasoline, a flame-suction-air heater known as such for cold-starting operations is set into operation. It is assured in this manner that a temperature is always present in the combustion space which is sufficient for an auto ignition.

It simplifies the construction of the installation and the operation if the same fuel is utilized for the operation of the flame suction heater as for the operation of the internal combustion engine.

In most cases under certain operating conditions, the assist of the flame-suction air heater will not be necessary. The fuel required therefor would be consumed needlessly and even harmful consequences such as, for example, material damages or reduction in power output by reason of excessively hot suction air might occur. For these reasons, it is proposed in an embodiment of the present invention that the flame-suction-air heater upon reaching a temperature sufficient for an ignition without the preheating by the flame-suction air heater in the combustion space is automatically turned off. This can take place by a mechanism which turns off the flame-suction air heater in dependence on the fuel quantity injected into the internal combustion engine, for example, in dependence on the position of the control rack of the injection pump. The turning-off, however, may also take place, for example, in dependence on the exhaust gas temperature. (Fuel quantity as also exhaust gas temperature provide a measure for the temperature in the combustion space which is the really important factor).

It may be advantageous under certain circumstances to cause the turning-off additionally in dependence on the rotational speed because the rotational speed also influences the auto-ignition behavior: At very low rotational speeds, the compression end temperature drops because a longer period of time is available, considered from an absolute point of view, for the cooling by means of the cooling water or the cooling air; and at high rotational speeds, the ignition delay must become shorter, calculated in absolute values because otherwise the coordination of the actual ignition to the piston position would no longer be correct. One has to take care by the use of warmer suction air that the ignition delay is shortened. If one therefore makes the shutting-off of the flame-suction-air heater additionally dependent on the rotational speed, one shuts off the flame-suction air heater at every rotational speed precisely when, with a view to a completely satisfactory continued running of the engine, it becomes possible in the non-assisted auto-ignition operation; in others words: One does not need to build into the automatic control mechanism a safety factor because of the rotational speed fluctuations.

Furthermore, a system is proposed in an embodiment of the present invention which measures auxiliary magnitudes such as, for example, the density or specific weight, which serve as a measure for the ignitability of the internal combustion engine fuel, and which establishes the operating readiness of the flame-suction-air heating system only in case of poorly ignitable fuels. The significance of this measure becomes apparent at once, for only with poorly ignitable internal combustion engine fuels, the flame-suction-air heater is required under load operation. However, one can also utilize the flame-suction-air heater with appropriate controls of any conventional type for the starting, and more particularly possibly also with otherwise ignitable internal combustion engine fuels.

Finally, it may be advantageous if heat-insulating measures for the prevention of the heat flow from the piston top surface on the combustion space side to the piston running surface are provided at the piston, for example, by the provision of a heat insulating groove. The piston top surface then remains hotter, and one is able to get along with less fuel for the flame-suction-air heater or one is able to shut off the heater earlier.

Accordingly, it is an object of the present invention to provide a process and apparatus for the operation of an air-compressing, auto-igniting injection internal combustion engine for multi-fuel operation which avoids by simple means the aforementioned shortcomings and drawbacks encountered in the prior art.

Another object of the present invention resides in a method and apparatus for operating an air-compressing, auto-igniting internal combustion engine for multi-fuel operation which maintains a completely satisfactory operation and a completely satisfactory self-ignition under all load and operating conditions.

A further object of the present invention resides in an internal combustion engine of the type described above which assures a reliable auto-ignition under load even with the use of poorly ignitable fuels, with relatively low compression ratios and under otherwise unfavorable operating conditions.

A still further object of the present invention resides in a method and apparatus for operating an air-compressing auto-ingiting internal combustion engine of the injection type for multi-fuel operation which assures at all times an adequate temperature in the combustion space for the auto-ignition by an appropriate control of a flame-suction-air heater.

Another object of the present invention resides in a process and apparatus for operating a multi-fuel internal combustion engine of the type described above which permits efficient use of a flame-suction-air heater without the danger of damage to the engine or parts thereof or a reduction in the output of the engine due to excessively hot suction air.

These and other objects, features and advantages of the present invention will become more apparent from the following description when taken in connection with the accompanying drawing which shows, for purposes of illustration only, one embodiment in accordance with the present invention, and wherein:

FIG. 1 is a schematic side view of an internal combustion engine operating according to the method in accordance with the present invention;

FIG. 2 is a partial axial cross-sectional view through the piston top part with a heat-insulating groove in accordance with the present invention; and FIG. 3 is a diagram indicating operating magnitudes which have an influence on the behavior of the auto-ignition.

Referring now to the drawing, and more particularly to FIG. 1, the internal combustion engine generally designated by reference numeral 1 illustrated in this figure is constructed as air-compressing and auto-igniting injection internal combustion engine which has a compression ratio that is relatively low for auto-igniting multi-fuel operation. Fuel is metered to the individual cylinders of the internal combustion engine 1 by an injection pump 2, to which this fuel is fed by way of a line 4 coming from a fuel tank 3. The air required for the combustion of the fuel in the combustion spaces of the cylinders is supplied to the suction line 6 by means of a super-charger 5 which may possibly be constructed as exhaust gas turbo-charger; the combustion air reaches the cylinders from the intake manifold 6 by way of individual suction pipe connections.

In order to be able to operate the internal combustion engine 1 under load with poorly ignitable fuels, for example, with gasoline, and thereby to achieve a favorable ignition and running behavior, a flame-suction-air heater 7 is provided at the beginning of the suction line or intake manifold 6, by means of which a flame heating of the suction air is produced in the suction line 6 by the combustion of the same type of fuel as is also used for the operation of the internal combustion engine. The flame-suction-air heater 7 which may be of any conventional construction is equipped with an injection device for the fuel consisting of a pump and of a discharge nozzle and with an ignition device. Additionally, shields or the like are arranged in the suction line 6 which prevent a blowing out of the produced flame and which contribute to achieving an intimate mixing between air and fuel. Fuel is fed to the flame-suction-air heater 7 by way of a pipe line 8 which branches off from the pipe line 4.

For the control of the flame-suction-air heater 7, an installation 9 is provided which controls the beginning and the end of the preheating of the suction air, the fuel quantity to be injected and the ignition system. This control installation 9 which is of conventional construction and forms no part of the present invention is, in its turn, influenced by a device 10 connected in the pipe line 4 and by a device 11 arranged at the injection pump 2.

The device 10 measures by conventional means the specific weight of the fuel as characteristic for the type of the fuel which is supplied at any given time in the pipe line 4 leading to the injection pump 2 and attains combustion in the internal combustion engine, whereas the device 11 indicates to the installation 9 by conventional means also, the respective position of the control rack in the injection pump 2. Since devices as are used for the measuring device 10 and displacement pick-up 11 are known in the art, a detailed description thereof is dispensed with herein.

The flame-suction-air heater 7 operates automatically in such a manner that during the operation of the internal combustion engine 1 with fuel that is not poorly ignitable, for example, with Diesel oil, no preheating of the suction air takes place whereas when the device 10 measures a feed to the injection pump 2 of a poorly ignitable fuel, for example, of gasoline, the flame-suction-air heater 7 is set immediately into operating readiness. The actual operation is maintained with the aid of the device 11 for such length of time until the internal combustion engine operates in a load range in which also poorly ignitable fuels are combusted without difficulties and troubles.

The installation may also be so constructed that the flame-suction-air heater starts to operate independently of the type of the fuel supplied to the internal combustion engine at low outside temperatures for facilitating the starting operation and remains in operation after the termination of the starting operation only if poorly ignitable fuels flow through the pipe line 4.

The control installation 9 may also be operatively connected to combustion space temperature measuring device 18 and/or exhaust gas temperature measuring device 19 such that the heater 7 is shut off when the effective combustion space temperature is sufficient to support ignition of even poorly ignitable fuels (the combustion space temperature being either measured directly by device 18 or indirectly by device 19). If either of devices 18 or 19 are utilized, the device 11 need not necessarily also be connected.

The piston 12 according to FIG. 2 of the internal combustion engine illustrated in FIG. 1 is provided with a heat-insulating groove 13 which surrounds the combustion space recess 14 and which prevents a flowing-off of heat from the combustion space recess 14 in the direction toward the sliding surfaces of the piston. As a result of the construction of the piston 12 with the heat-insulating groove 13 and the higher piston temperature conditioned thereby, one is able to keep the fuel consumption of the flame-suction-air heater 7 (FIG. 1) lower. Additionally, the flame-suction-air heater can be shut off earlier.

The diagram according to FIG. 3 illustrates the effective average pressure in the internal combustion engine 1 (FIG. 1) as a function of the rotational speed of the internal combustion engine whereby the curves 15 and 16 represent the effective average pressure at respectively constant injection quantity, and more particularly, the curve 15 at full load and the curve 16 at a predetermined partial load. The curve 17 represents the average pressure, below which an auto-ignition operation at the respective rotational speed is no longer possible without setting into operation the flame-suction-air heater.

If one therefore makes the shutting-off of the flame-suction-air heater dependent exclusively on the average pressure (position of the injection pump control rack), then one can shut off the flame-suction-air heater only upon reaching the control rack position of the curve 16 and therefore has to keep the system in operation superfluously within the area between the curves 16 and 17. An additional correction as a function of the rotational speed, (by schematically indicated engine rotational speed measuring device 20) however, would make it possible to realize the shut-off control along the curve 17 which would then take place at the individual rotational speeds with differing control rack position. Since means for detecting the rotational speed are known as such, a detailed description thereof is also dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A method of operating an air-compressing and auto-igniting injection internal combustion engine with multiple fuel operating capability comprising:
   providing a selectively operable flame-suction-air heater means for selectively heating intake air supplied to the engine,
   and controlling the operation of said heater means with control means,
   wherein said controlling includes measuring auxiliary magnitudes which indicate the ignitability of fuel being supplied to the engine and operating said heater means during at least some engine operating conditions only when relatively poorly ignitable fuel is being supplied to the engine.

2. A method according to claim 1, characterized in that the poorly ignitable fuel is gasoline.

3. A method according to claim 2, characterized in that the internal combustion engine has a relatively low compression ratio.

4. A method according to claim 1, comprising the step of using the same fuel for the operation of the heater means as is used for the operation of the internal combustion engine.

5. A method according to claim 4, further comprising the step of automatically shutting off the heater means upon reaching a temperature in the combustion space of the engine sufficient for an ignition without preheating by the heater means.

6. A method according to claim 1, further comprising the step of automatically shutting off the heater means upon reaching a temperature in the combustion space of the engine sufficient for an ignition without preheating by the heater means.

7. A method according to claim 6, wherein said step of automatically shutting off the heater means includes detecting the quantity of fuel being supplied to the engine.

8. A method according to claim 6, wherein said step of automatically shutting off the heater means includes detecting the engine exhaust gas temperature.

9. A method according to claim 1, wherein said controlling includes operation of said heater means independently of the fuel being supplied to the engine during engine starting operations at low outside temperatures and maintaining operation of said heater means after said engine starting operations only when said relatively poorly ignitable fuel is being supplied to the engine.

10. A method according to claim 9, further comprising the step of automatically shutting off the heater means upon reaching a temperature in the combustion space of the engine sufficient for an ignition without preheating by the heater means.

11. A method according to claim 1, wherein said measuring includes measuring the specific gravity of the fuel.

12. A method according to claim 1, further comprising the step of automatically shutting off the heater means in dependence on the engine rotational speed.

13. An internal combustion engine for multi-fuel operation comprising:
   heater means for heating intake air being supplied to the engine,
   and heater control means for automatically controlling the operation of said heater means,
   wherein said control means incldes fuel characteristic measuring means for measuring auxiliary magnitudes which indicate the ignitability of fuel being supplied to the engine and means for maintaining operation of said heater means during at least some engine operating conditions only when relatively poorly ignitable fuel is detected by said fuel characteristic measuring means.

14. An internal combustion engine according to claim 13, wherein said control means includes means for operating said heater means independently of the ignitability of the fuel being supplied to the engine during engine starting operations at low outside temperatures and means for maintaining operation of said heater means after the termination of engine starting operations only when said relatively poorly ignitable fuel is being supplied to the engine.

15. An internal combustion engine according to claim 13, wherein said engine is an air-compreswing, injection-type engine with auto-ignition.

16. An internal combustion engine according to claim 15 characterized in that the engine has a relatively low compression ratio for auto-igniting multi-fuel operation.

17. An internal combustion engine according to claim 15, characterized in that the compression ratio of the engine is of the order of the compression ratio utilized in customary Diesel engines.

18. An internal combustion engine according to claim 17, characterized in that the fuel which is poorly ignitable is gasoline.

19. An internal combustion engine according to claim 15, characterized by means for supplying the same fuel for the operation of the heater means as is used for the operation of the internal combustion engine.

20. An internal combustion engine according to claim 15, characterized by further means for shutting off the heater means upon reaching a temperature in the combustion space of the internal combustion engine which is sufficient for an ignition without preheating by the heater means.

21. An internal combustion engine according to claim 20, wherein said further means shuts off the heater means as a function of the quantity of fuel injected into the internal combustion engine.

22. An internal combustion engine with an injection pump having a control rack according to claim 21, characterized in that said further means is operable as a function of the position of the control rack of the injection pump.

23. An internal combustion engine according to claim 20, characterized in that said further means is operable to shut off the heater means in dependence on the exhaust gas temperature.

24. An internal combustion engine according to claim 23, further comprising means operable to shut off the flame-suction-air heater means in dependence on the rotational speed.

25. An internal combustion engine according to claim 22, further comprising means operable to shut off the flame-suction-air heater means in dependence on the rotational speed.

26. An internal combustion engine according to claim 15, characterized by means for utilizing the heater means also for starting the engine.

27. An internal combustion engine according to claim 13, characterized in that each piston of the engine is provided with heat-insulating means for preventing the heat flow from the piston top surface on the side of the combustion space to the piston sliding surfaces.

28. An internal combustion engine according to claim 27, characterized in that said insulating means is formed by an annular groove in the piston top.

29. An internal combustion engine according to claim 17, characterized by further means for shutting off the heater means upon reaching a temperature in the combustion space of the internal combustion engine which is sufficient for an ignition without preheating by the heater means.

30. An internal combustion engine according to claim 29, further comprising means operable to shut off the heater means in dependence on the rotational speed.

31. An internal combustion engine according to claim 30, wherein said further means shuts off the heater means as a function of the quantity of fuel injected into the internal combustion engine.

32. An internal combustion engine with an injection pump having a control rack according to claim 31, characterized in that said further means is operable as a function of the position of the control rack of the injection pump.

33. An internal combustion engine according to claim 13, wherein said measuring means measures the specific gravity of the fuel.

34. An internal combustion engine according to claim 30, characterized by means for utilizing the flame-suction-air heater means also for starting the engine.

35. An internal combustion engine according to claim 34, characterized in that each piston of the engine is provided with heat-insulating means for preventing the heat flow from the piston top surface on the side of the combustion space to the piston sliding surfaces.

36. An internal combustion engine according to claim 35, characterized in that said insulating means is formed by an annular groove in the piston top.

37. An air-compressing, injection-type internal combustion engine with auto-ignition for multi-fuel operation, which comprises a flame-suction-air heater means, and means for setting into operation the flame-suction-air heater means during the operation of the engine under load with a poorly ignitable fuel, characterized by a means for measuring auxiliary magnitudes which indicate the ignitability of the internal combustion engine fuel and which readies the operability of the flame-suction-air heater means only in the presence of poorly ignitable fuels.

38. An internal combustion engine according to claim 37, wherein said measuring means measures the specific gravity of the fuel.

* * * * *